REMOVABLE BUS CONDUCTOR CONNECTOR

Filed June 10, 1965 4 Sheets-Sheet 1

WITNESSES:
John L. Chopp
James F. Young

INVENTOR
Charles M. Lear
BY
Clement L. McHale
ATTORNEY

June 13, 1967 C. M. LEAR 3,325,588

REMOVABLE BUS CONDUCTOR CONNECTOR

Filed June 10, 1965 4 Sheets-Sheet 2

REMOVABLE BUS CONDUCTOR CONNECTOR

Filed June 10, 1965

June 13, 1967 C. M. LEAR 3,325,588

REMOVABLE BUS CONDUCTOR CONNECTOR

Filed June 10, 1965 4 Sheets-Sheet 4

United States Patent Office
3,325,588
Patented June 13, 1967

3,325,588
REMOVABLE BUS CONDUCTOR CONNECTOR

Charles M. Lear, Washington, Pa., assignor to Westinghouse Electric Corporation, Pittsburgh, Pa., a corporation of Pennsylvania Filed June 10, 1965, Ser. No. 462,937
7 Claims. (Cl. 174—94)

This invention relates to electrical bus structures and, more particularly, to metal enclosed isolated phase bus structures. In certain applications of electrical bus structures, particularly those of the metal-enclosed, isolated phase type, it is desirable to provide a disconnecting link between different portions of the bus conductor included in the overall bus structure or between the bus conductor of the bus structure and the terminals of an associated electrical apparatus, such as a generator or transformer. Such a disconnecting link may be removed to provide an insulating gap between different sections of the bus structure or between the bus structure and the associated electrical apparatus to which the bus structure is normally connected. In addition, a flexible joint structure may be provided at certain locations in a bus structure between different portions of the bus conductor in order to prevent the transmission of certain mechanical forces, such as vibration, between the bus structure and the associated electrical appartus or to allow for the thermal expansion and contraction of different portions of the bus conductor included in the bus structure during the operation of the bus structure. In other words, a flexible joint may be employed to mechanically isolate different portions of the bus structure from one another, to allow limited or predetermined relative movements of different portions of the bus structure with respect to one another, or to mechanically isolate the bus structure from the associated electrical apparatus by allowing predetermined or limited movements of the electrical apparatus with respect to the bus structure. It is, therefore, desirable to provide an improved means for flexibly joining substantially aligned bus conductors which may be readily removed to provide an electrically insulating gap between different portions of the bus conductor or between the bus conductor and an associated electrical apparatus.

It is an object of this invention to provide a new and improved electrical bus structure.

Another object of this invention is to provide an improved means for joining substantially aligned bus conductors.

A more specific object of this invention is to provide an improved conducting link means for connecting and disconnecting different conductor portions in an electrical bus structure which also accommodates limited relative movement of the interconnected conductor portions or limited relative movement of a conductor portion and an associated electrical apparatus.

Other objects of the invention will, in part, be obvious and will, in part, appear hereinafter.

For a fuller understanding of the nature and objects of the invention, reference should be had to the following detailed description taken in conjunction with the accompanying drawings, in which.

Figure 1:
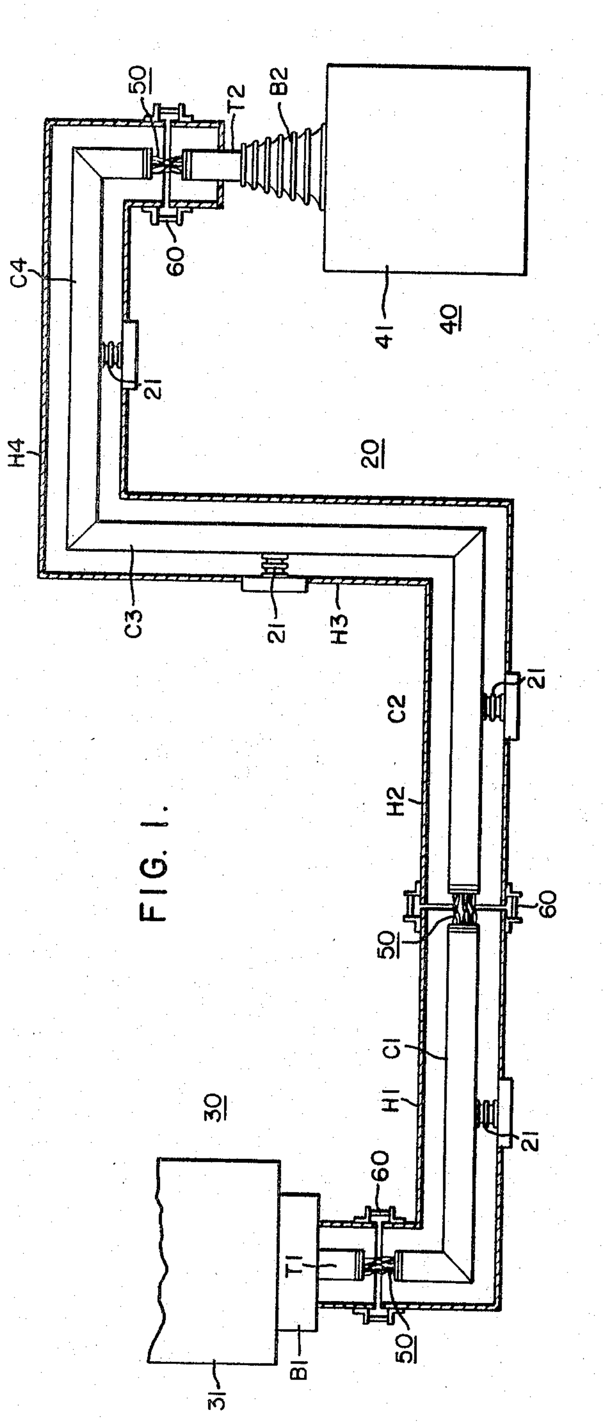
FIGURE 1 is a view, partly in side elevation and partly in section, of an isolated phase bus structure embodying the principal features of the invention.
Figure 2:
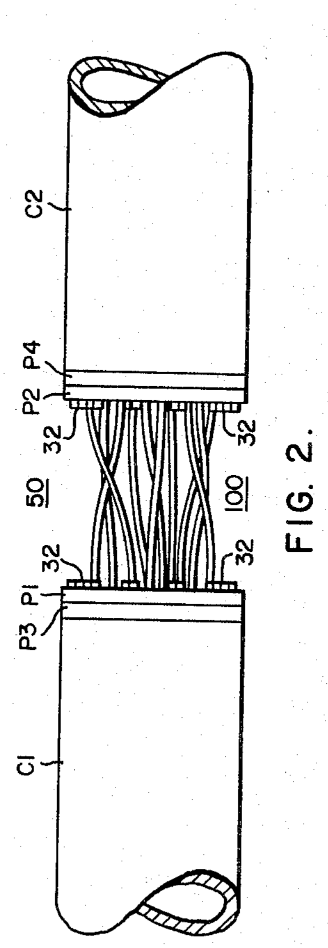
FIG. 2 is an enlarged view in side elevation of a portion of a joint structure utilized in the bus structure shown in FIG. 1.

Referring now to the drawings and FIG. 1 in particular, there is illustrated one phase of a three-phase, isolated phase bus structure 20 which is of the type disclosed in greater detail in copending application, Ser. No. 407,347, filed Oct. 29, 1964, by Arthur B. Niemoller and assigned to the same assignee as the present application. Each phase of the bus structure 20 comprises a phase bus conductor which in this instance includes the elongated conductor portions C1, C2, C3 and C4 and the associated housing sections H1, H2, H3 and H4 for enclosing the conductor portions C1, C2 and C3, respectively, as well as the conducting joint structures 50 which are provided to electrically and structurally interconnect the adjacent spaced ends of the substantially aligned conductors C1 through C4 and also to electrically and structurally interconnect the condutcor C1 with the therminal T1 of the electrical apparatus 30 and the conductor C4 with the terminal T2 of the electrical apparatus 40. The other phases of the bus structure 20 would be identical to that shown in FIG. 1 and would be laterally spaced from the phase shown in FIG. 1. In a typical application, the bus structure 20 may be employed to electrically interconnect a first electrical apparatus or source of electrical power, such as the generator indicated at 30, and a second electric apparatus, such as a transformer or circuit breaker as indicated at 40, which might be electrically connected to the conductor C4 to carry relatively high currents between said apparatus at relatively high potentials or voltages such as 15 kv., 23 kv. or higher voltages. The conductors C1 through C4 may have any suitable shape or cross-section which provides the required current carrying capacity and in this instance are illustrated as being tubular or hollow cylindrical in shape, as shown in FIG. 2. The conductors C1 through C4 may be formed from any suitable electrically conducting material, such as copper or aluminum.

In order to support and position the phase conductor portions C1 through C4, as well as the joint structures 50, within the associated housing sections, the spaced insulating supports or insulators 21 are provided, as described in detail in the copending application previously mentioned. The insulators 21 shown in FIG. 1 may be of the type which substantially prevent radial movement of the associated conductor portions C1 through C4 but permit limited axial movement of the conductor portions during the thermal expansion and contraction of the conductor portions which result during operation of the bus structure 20. It is to be noted that the space between each of the conductor portions C1 through C4 and the associated housing sections is substantially filled with a suitable electrically insulating fluid, such as air or other insulating gas. The housing sections H1 through H4 are preferably formed from a suitable non-magnetic, electrically conducting material, such as aluminum in order to magnetically shield the magnetic fluxes which are produced when current flows in the conductor portions C1 through C4 of the different phases of the bus structure 20, to insure the safety of operating personnel, and to prevent the occurrence of a line to line or phase to phase fault condition during the operation of the bus structure 20.

The generator 30 normally includes a metallic housing or tank 31 which is normally maintained at ground or zero potential and a plurality of terminal conductors, as indicated at T1, which are electrically insulated from the housing 31 by means of the electrically insulating bushings indicated at B1. Similarly, the electrical apparatus or circuit breaker 40 includes a metallic housing or tank 41 which is normally maintained at zero or ground potential and a plurality of terminal conductors T2 which are electrically insulated from the housing 41 by means of the electrically insulating bushings indicated at B2. The terminal conductors T1 of the generator 30 and the terminal conductors T2 of the electrical apparatus 40 may be arranged to pass into the adjacent housings of the bus structure 20 through a flexible sealing diaphragm as disclosed in my copending application, Ser. No. 443,360, filed Mar. 29, 1965, which is assigned to the same assignee as the present application.

Referring now to FIGS. 1 and 2, there is illustrated a flexible conducting joint structure 50 which is adapted to electrically and structurally connect the substantially rigid terminal conductors T1 of the generator 30 to the bus conductors C1, to electrically and structurally connect the conductor portions C1 and C2, and to electrically and structurally connect the rigid terminal conductors T2 of the electrical apparatus 40 to the conductor portions C4. The flexible conducting joint 50 is provided to mechanically isolate the bus structure 20 from the generator 30 and from the electrical apparatus 40 and also to permit predetermined or limited relative movements of the different conductor portions included in the bus structure 20 due to thermal expansion and contraction of the different conductor portions or due to vibration or due to certain bending movements of the different conductor portions which may result during the operation of the bus structure 20. In order to permit access to the flexible joint 50 which interconnects the conductor portions C1 and C2, a joint structure 60 may also be provided between the housing sections H1 and H2 as described in detail in copending application Ser. No. 407,346, filed Oct. 29, 1964 by Arthur B. Niemoller and assigned to the same assignee as the present application.

Figure 3:
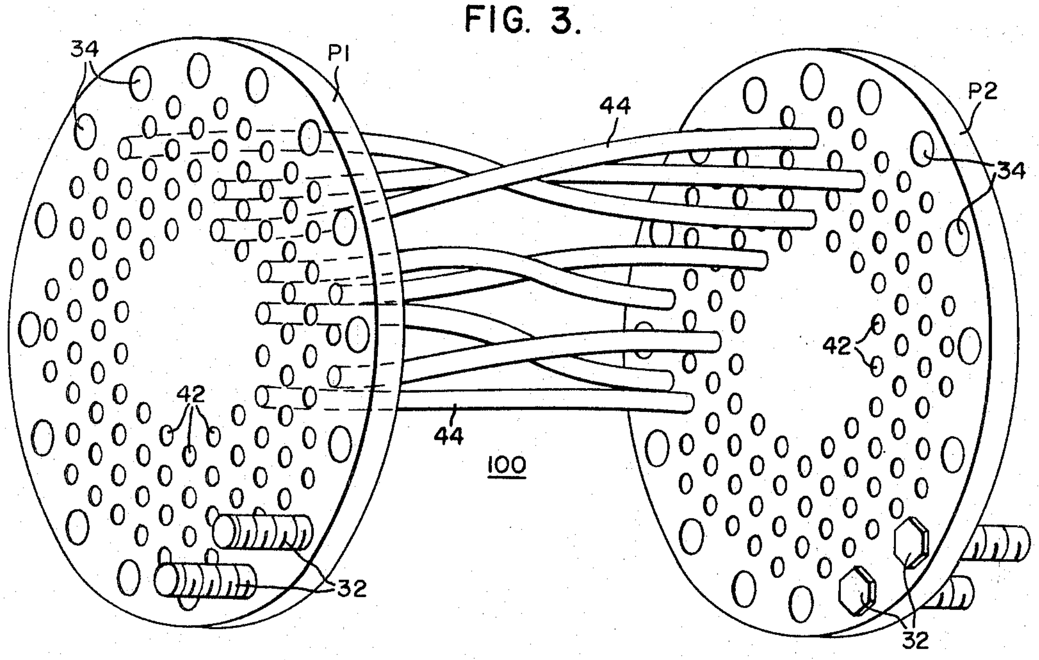
FIG. 3 is an enlarged perspective view of a portion of a disconnecting conductor link utilized in the joint structure shown in FIG. 2.

Referring now to FIGS. 2 and 3, the joint structure 50 includes a disconnecting conductor link 100 which is removable to provide an electrically insulating gap between the adjacent spaced ends of the interconnected conductor portions C1 and C2 or between the terminal conductors of the generator 30 and electrical apparatus 40 and the respective conductor portions of the bus structure 20. In order to provide a suitable supporting means to which the disconnecting link 100 may be removably secured, the supporting end plates P3 and P4 are secured to the adjacent ends of the conductor portions C1 and C2, respectively, by any suitable means such as welding or brazing. The supporting end plates P3 and P4 are preferably formed from the same conducting material, such as aluminum, as the associated conductor portions C1 and C2, respectively, which can be readily welded to the conductor portions C1 and C2, and are preferably of the same configuration in cross section, which is generally circular as illustrated or which may be rectangular or square in a particular application.

As best shown in FIG. 3, the disconnecting link 100 includes a pair of spaced, substantially parallel end plates P1 and P2 which can be formed from the same conducting material, such as aluminum, as the supporting end plates P3 and P4 or from copper for better electrical conductivity and should preferably be of the same configuration in cross section, which in this instance is generally circular. In order to permit the removable securing of the end plates P1 and P2 to the conductor portions C1 and C2, respectively, at the supporting end plates P3 and P4, respectively, each of the end plates P1 and P2 includes a plurality of spaced openings 34 around the outer periphery of each of the plates P1 and P2. A suitable fastening means, such as the bolts 32 may then pass through the openings 34 to engage corresponding threaded openings (not shown) which are provided in each of the supporting end plates P3 and P4. In order to electrically and structurally interconnect the end plates P1 and P2 of the disconnecting link 100, a plurality of flexible conductors or cable portions 44 extend between the plates P1 and P2 with the opposite ends of each flexible conductor 44 being secured to the respective end plates P1 and P2. In this instance, a plurality of openings 42 are provided in each of the end plates P1 and P2 adjacent to the outer periphery and radially and angularly spaced in a staggered arrangement about a central axis which extends through the centers of the plates P1 and P2. The ends of the flexible conductors may be assembled through the openings 42 and then secured to the respective end plates P1 and P2 by any suitable means, such as brazing. After brazing, any portions of the flexible conductors 44 which extend through the openings 42 beyond the planes defined by the external surfaces of the end plates P1 and P2 may be ground off to insure that the surfaces of the end plates P1 and P2 which are secured to the associated supporting end plates P3 and P4 will be smooth. It should be understood that in certain applications that the openings 42 in the plates P1 and P2 may be omitted and that the ends of the flexible conductors 44 may be simply brazed or welded to the associated end plates P1 and P2. In order to insure a better electrical contact between the disconnecting link 100 and the associated supporting end plates P3 and P4, a suitable grease-type compound or paste is preferably applied to the adjacent surfaces of the plates P1 and P3 and to the adjacent surfaces of the plates P2 and P4 to prevent oxidation of the adjacent metal surfaces.

It is important to note that the positions at which the opposite ends of each of the flexible conductors 44 are secured to the associated end plates P1 and P2 are transposed or disposed radially with respect to one another as shown in FIG. 3. In particular, one end of each of the flexible conductors 44 is secured to the associated end plate at a point which is relatively closer to the outer periphery of the end plate and the other end of each flexible conductor 44 is secured or located at a point which is relatively farther away from the outer periphery of the associated end plate than the first mentioned end of the flexible conductor. This transposition of the flexible conductors 44 results in a more balanced distribution of a relatively high alternating current between the different flexible conductors 44 and also decreases the effective resistance of the disconnecting link 100 when the disconnecting link 100 is employed to carry alternating current which would otherwise be greater due to skin effect or proximity effect.

In the operation of the bus structure 20, the flexible conducting joint 50 between the conductor portions C1 and C2 which includes the disconnecting link 100, as just described, permits limited or predetermined relative movements of the conductor portions C1 and C2 relative to one another during the operation of the bus structure 20 due to thermal expansion and contraction of the conductor portions or due to other relative movements of said conductor portions which may result during operation of the bus structure 20. It is to be noted that for the flexible conducting joints 50 disposed between the terminal conductor T1 of the generator 30 and the conductor portions C1 and for the flexible conducting joint 50 between the conductor portions C4 and the terminal conductor T2 of the electrical apparatus 40, one of the associated supporting members or end plates may be a terminal conductor of the generator 30 or the electrical apparatus 40 rather than a supporting end plate which is secured to one of two interconnected conductor portions as in the case of the flexible conducting joint 50 which electrically and structurally interconnects the conductor portions C1 and C2. In the case of the flexible conducting joints 50 between the conductor portions C1 and C4 and the associated terminal conductors T1 and T2, respectively, of the generator 30 and the electrical apparatus 40, respectively, the flexible conducting joints 50 function to mechanically isolate the generator 30 from the bus structure 20 and to mechanically isolate the electrical apparatus 40 from the bus structure 20 to thereby prevent the transmission of certain mechanical forces, such as vibration, which might otherwise be transmitted to the bus structure 20.

Figure 4:
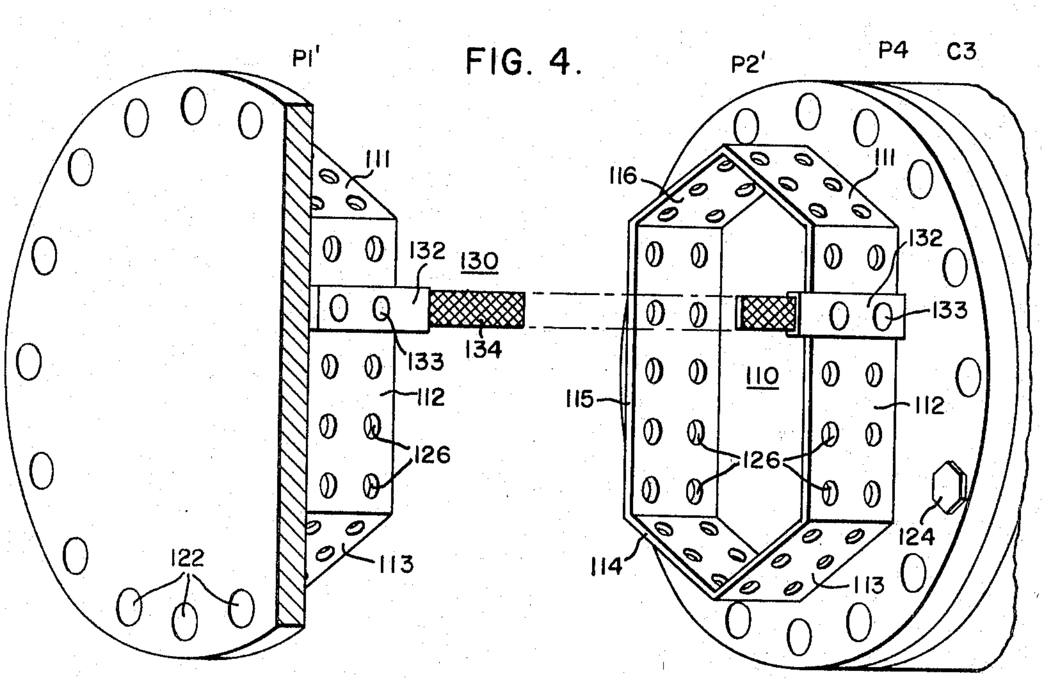
FIG. 4 is an exploded perspective view, illustrating a modified construction of the disconnecting means shown in FIG. 3.

Referring now to FIG. 4, there is illustrated a modified disconnecting link 150 which may be employed in certain applications instead of the disconnecting link 100 just described. In general the disconnecting link 150 is similar to the disconnecting link 100 except that the plurality of flexible conductors provided in the disconnecting link 150 are not transposed between the points at which the ends of each flexible conductor are secured to the associated end plates P1′ and P2′, as indicated in FIG. 4. In particular, the disconnecting link 150 similarly includes first and second spaced conducting end plates P1′ and P2′ respectively, which are adapted to be removably secured to the spaced adjacent ends of two substantially aligned bus conductors which may each be provided with supporting end plates similar to the end plates P3 and P4 previously described. Each of the end plates P1′ and P2′ includes a plurality of openings 122 which are spaced from one another adjacent to and around the outer periphery of each of said end plates to receive a plurality of fastening means, such as the bolts 124, which pass therethrough to engage corresponding threaded openings (not shown) provided in the supporting end plates P3 and P4 on the associated conductor portions.

Each of the end plates P1′ and P2′ includes a terminal conducting structure 110 which is generally hollow cylindrical or tubular in configuration. In this instance, the terminal structure 110 includes a plurality of side wall portions 111 through 116 disposed adjacent to the outer periphery of each of the end plates P1′ and P2′ to project away from the surface of each of said plates toward the opposite end plate of the disconnecting link 150. Each of the side wall portions 111 through 116 are secured to the associated end plate by suitable means, such as welding or brazing, and are also secured to the adjacent wall portions at the edges thereof by the same means. It is to be noted that in this instance the side wall portions 111 through 116 of the terminal structure 110 intersect at an obtuse angle of substantially 120° which is included between each pair of intersecting side wall portions. It is to be noted that the different side wall portions 111 through 116 of the terminal structure 110 serve to laterally brace one another in an overall closed loop terminal structure. Each of the side wall portions 111 through 116 includes a plurality of pairs of openings 126 which may be internally threaded to receive suitable fastening means, such as bolts. The pairs of openings 126 are spaced from each other around the outer periphery of the terminal structure 110 with the openings 126 of each pair being axially spaced from one another with respect to an axis extending between the centers of the end plates P1′ and P2′.

In order to electrically connect the end plates P1′ and P2′ a plurality of flexible conductors 130 (only one shown) extend between the terminal structures 110 on the respective end plates and are secured thereto by suitable fastening means, such as bolts 133, which pass through a pair of openings included in the conducting lug portions 132 provided at each end of each of the flexible conductors 130 and through corresponding openings 126 on the terminal structure 110. Each of the flexible conductors 130 includes an intermediate portion 134 which may be formed from braided conducting wire or cable, such as copper, which is flexible to permit a limited or predetermined relative movement between the interconnected conductor portions at the opposite sides of the disconnecting link 150. When the disconnecting link 150 is assembled or secure dto the supporting end plates or terminal conductors on the interconnected conductors or conductor and electrical apparatus, a suitable joint compound may be applied to the adjacent surfaces of the end plates P1′ and P2′ and the associated supporting end plates P3 and P4, respectively, to prevent oxidation of the adjacent metal surfaces which are preferably formed from the same conducting material as the interconnected conductors.

Figure 5:
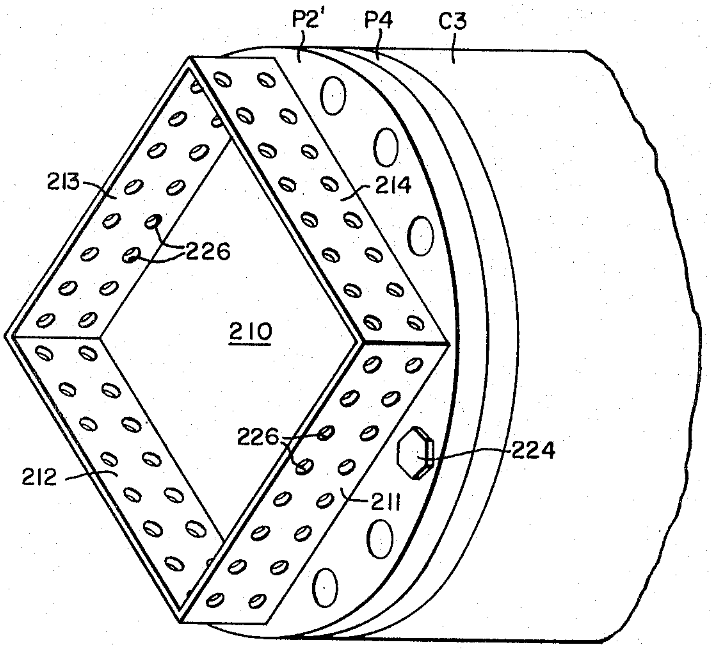
FIG. 5 is a perspective view, illustrating another modified construction of the disconnecting link shown in FIGS. 3 and 4.

Referring now to FIG. 5, there is illustrated another modified disconnecting link 200 which is similar to the disconnecting link 150 just described except that the disconnecting link 200 includes a pair of end plates P1′ and P2′ with a generally rectangular or square terminal structure 210 secured to each of the associated end plates P1′ and P2′ similarly to the terminal structure 110 of the disconnecting link 150 just described. The terminal structure 210 includes a plurality of side wall portions 211 through 214 which are secured to the associated end plates adjacent to the outer periphery and also secured at the edges to the adjacent side wall portions to form a generally hollow cylindrical or tubular terminal structure which projects away from the surface of the associated end plate toward the opposite end plate of the disconnecting link 200. Each of the side wall portions 211 through 214 includes a plurality of pairs of openings 226 which are spaced from one another around the outer periphery of the terminal structure 210 to receive a plurality of flexible conductors similar to the flexible conductor 130, shown in FIG. 4. The openings of each pair of openings 226 are axially spaced from one another with respect to an axis extending between the centers of the end plates P1′ and P2′. Each of the openings 226 may be surrounded by an internally threaded flange portion (not shown) which would be secured to or formed integrally with the inner sides of the side wall portions 211 through 214 to receive a suitable fastening means, such as a bolt.

It is to be noted that the disconnecting links 150 and 200 are similar in that the flexible conductors which are employed may be conveniently secured to the substantially flat side wall portions of the associated terminal structures provided on the end plates of each disconnecting link to insure a good electrical contact between the different portions of the disconnecting links. The disconnecting links 150 and 200 are particularly suitable for applications where the transposition of the interconnecting flexible conductors is not required. The flexible conductors 130 employed as part of each of the disconnecting links 150 and 200 may be formed with substantially flat end lug portions 132 since the flexible conductors 130 may be secured to the substantially flat side wall portions of each of the terminal structures 110 and 210 of the respective disconnecting links. It is to be understood in certain applications that a terminal structure which is substantially circular in configuration may be provided if the lug portions of the associated flexible conductors are formed to be arcuate in configuration to insure good electrical contact between the opposite ends of each flexible conductor which are connected to the associated terminal structures on the respective end plates of each disconnecting link.

Figure 6:
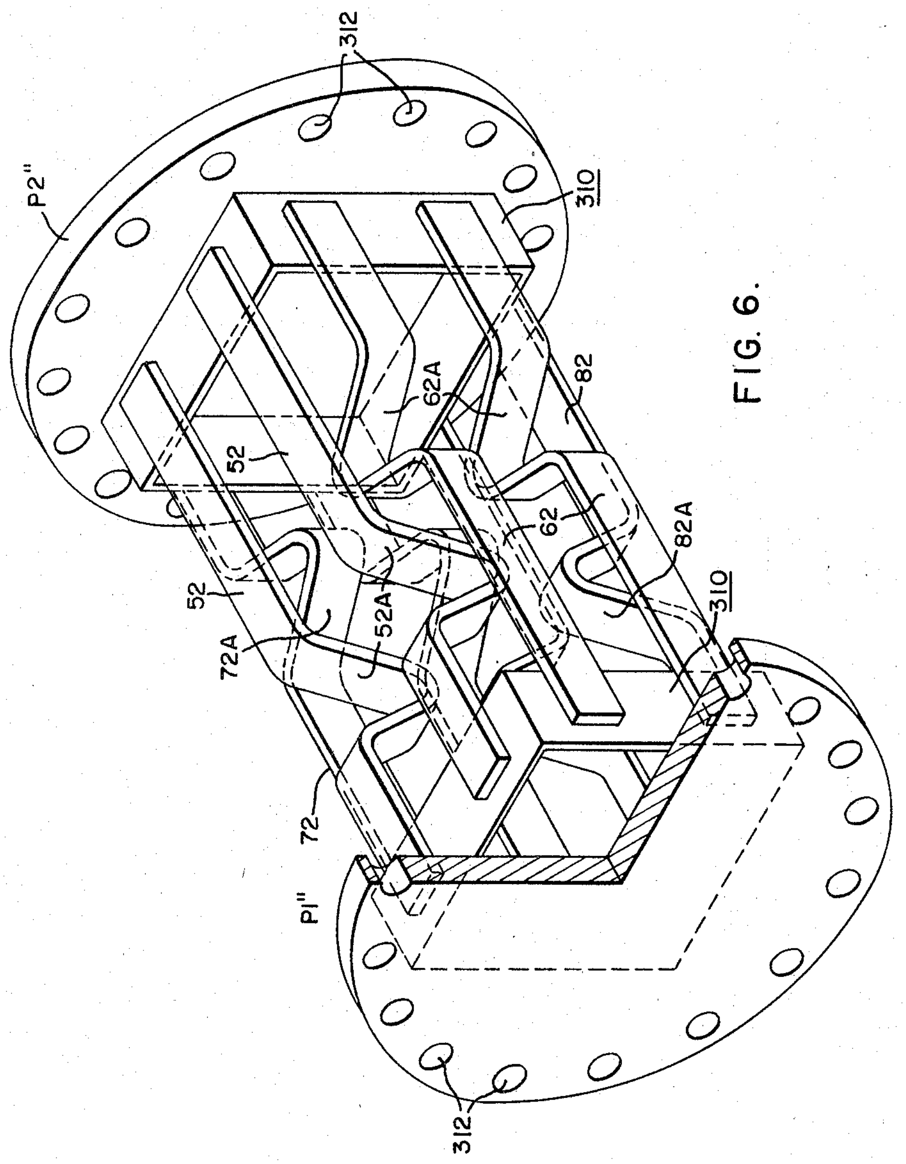
FIG. 6 is a perspective view, partly cut away, illustrating another modified construction of the disconnecting means shown in FIGS. 3, 4 and 5.

Referring now to FIG. 6, there is illustrated another modified disconnecting link 250 which includes a pair of spaced, substantially parallel, conducting end plates P1″ and P2″ which are adapted to be removably secured to associated supporting end plates or terminal conductors similarly to the previously described disconnecting links. Each of the end plates P1″ and P2″ may include a plurality of openings 312 spaced around the outer periphery thereof (not shown) similarly to the end plates of the disconnecting links previously described to receive fastening means, such as bolts, which pass through the openings 312 and corresponding openings in the associated supporting end plates and are threadly secured to the associated supporting end plates or terminal conductors. Each of the end plates P1″ and P2″ has a terminal structure 310 mounted thereon which is similar to the terminal structures 210 of the disconnecting link 200 previously described in detail. The disconnecting link 250 in this instance includes a plurality of pairs of laminated interconnecting conductors 52, 62, 72 and 82 connected between corresponding side wall portions of the terminal structures 310 on the associated conducting end plates P1″ and P2″. Each laminated conductor includes an arcuate or generally U-shaped portion that is adapted to flex or deflect to permit limited or predetermined relative movements of the interconnected conductors or electrical apparatus. More specifically, the opposite pairs of spaced conductors 62 and 72 include the intermediate arcuate portions 62A and 72A, respectively, and are preferably formed from a resilient conducting material of the sheet type, such as copper or aluminum, with the opposite ends of the conductors 62 and 72 being secured by suitable means such as welding or brazing to corresponding side wall portions of the terminal structures 310 of the associated end plates P1″ and P2″. The end portions of the conductors 62 are disposed substantially perpendicular to the surface of the associated end plates and are substantially parallel to the corresponding end portions of the opposite pair of laminated sheet conductors 72 with the arcuate portions of the conductors 62 and 72 projecting inwardly away from the outer periphery of the associated end plates P1″ and P2″, as shown in FIG. 6. Similarly, the other pairs of sheet conductors 52 and 82 shown in FIG. 6 include the arcuate or generally U-shaped portions 52A and 82A, respectively, with said arcuate portions projecting inwardly away from the other periphery of the associated end plates P1″ and P2″ toward one another, as shown in FIG. 6. The end portions of the conductors 52 and 82 are disposed at substantially right angle with respect to the corresponding portions of the remaining conductors 62 and the conductors 72 opposite to the latter conductors. The arcuate portions 62A and 72A of the first pair of sheet conductors 62 and 72 are preferably displaced from the arcuate portions 52A and 82A of the sheet conductors 52 and 82, respectively, with respect to an axis extending between the centers of the end plates P1″ and P2″ to permit deflection of the different laminated sheet conductors during the operation of the associated bus structure and to avoid interference between the different sheet conductors depending upon the relative depth of the arcuate portions included in each of the sheet conductors.

Figure 7:
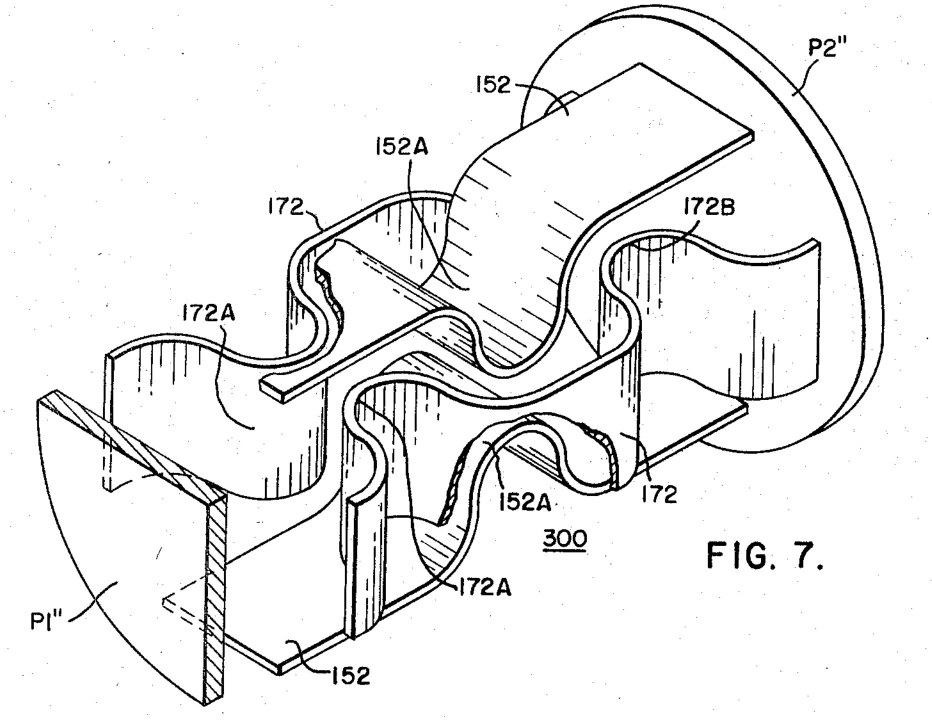
FIG. 7 is a perspective view illustrating another modified construction of the disconnecting means shown in FIGS. 3 through 6.

Referring now to FIG. 7, there is illustrated another modified disconnecting link 300 similar to the disconnecting link 250 just described in which the interconnecting conductors are formed from laminated conducting sheet material, such as copper or aluminum. The disconnecting link 300 similarly includes a pair of spaced, substantially parallel conducting end plates P1″ and P2″ similarly to the disconnecting link 250. The conducting end plates P1″ and P2″ are interconnected by a first pair of laminated conducting sheet members 172 and 162 each of which includes a pair of generally U-shaped or arcuate portions 172A and 172B and 162A and 162B which are spaced from one another along the length of the associated sheet conductor and project inwardly away from the outer periphery of the associated end plates P1″ and P2″. The end portions of the sheet conductors 172 and 162 are directly secured to the associated end plates by any suitable means, such as welding or brazing, and are disposed substantially perpendicular to the surfaces of the associated end plates as shown in FIG. 7. The disconnecting link 300 also includes a second pair of interconnecting sheet conductors 152 and 182 which include the intermediate arcuate or U-shaped portions 152A and 182A, respectively, which project inwardly away from the outer periphery of the associated end plates intermediate the first and second U-shaped portions of the associated sheet conductors 172 and 162 so that the arcuate portions 152A and 182A of the sheet conductors 152 and 182, respectively, are at least partially nested between the U-shaped portions of the sheet conductors 172 and 162. It is to be understood that the disconnecting link 300 may include terminal structures mounted on the end plates similarly to the disconnecting link 250 just described.

It is to be noted that in the operation of the bus structures, which include the various disconnecting links as disclosed, the flexible or resilient conductors included in each of the disconnecting links flex or deform during the operation of the bus structure to permit predetermined or relative movements of the interconnected conductor portions or conductors and terminal conductors of the associated electrical apparatus to which the bus structure is electrically connected. In addition, each of the disconnecting links as described is readily removable to provide an electrically insulating gap between the normally connected conductor portions or between the bus structure and the associated electrical apparatus to permit certain testing or maintenance operations which may be required in connection with the electrical apparatus or the bus structure.

The apparatus employing or embodying the teachings of this invention has several advantages. For example, a disconnecting link as disclosed provides a flexible joint structure which eliminates the need for separate flexible joints which would otherwise be required at certain locations in a bus structure. In addition, wherever a flexible joint is required in a bus structure as disclosed, a disconnecting link may be provided which is readily removable to permit the testing or maintenance of either the bus structure or the associated electrical apparatus. In at least one embodiment of the disconnecting link disclosed, the total current is more evenly distributed between the various flexible conductors which extend between the end plates of the disconnecting link to improve the current carrying efficiency of the disconnecting link as disclosed.

Since numerous changes may be made in the above-described apparatus and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. An electrically conducting link adapted to electrically interconnect first and second bus conductors having spaced adjacent ends comprising first and second spaced, substantially parallel, conducting end plates adapted to be removably secured to the ends of the respective bus conductors and a plurality of flexible conductors extending between said end plates, one end of each flexible conductor being secured to one of said end plates and the other end of each flexible conductor being secured to the other of said end plates, the adjacent ends of the flexible conductors which are secured to each end plate being spaced from one another with one end of each of said flexible conductors being disposed relatively closer to the outer periphery of the associated end plate and the other end of each flexible conductor being disposed relatively farther away from the outer periphery of the associated end plate than said one end.

2. An electrically conducting link adapted to electrically interconnect first and second cylindrical conductors having spaced adjacent ends comprising first and second spaced, substantially parallel, generally circular end plates adapted to be releasably secured to the ends of the respective conductors, each of said end plates including a plurality of openings radially and angularly spaced with respect to the center of the plate, and a plurality of flexible conductors connected between said end plates, one end of each flexible conductor being disposed in an opening in one of said end plates and the other end being disposed in an opening in the other end plate, the opposite ends of each flexible conductor being secured to the associated end plates, the openings associated with each flexible conductor being displaced from the outer peripheries of the associated end plates at radially different distances.

3. A bus structure comprising first and second substanstantially aligned conductors having adjacent ends spaced from one another, an electrically conducting member disposed to interconnect the adjacent ends of said first and second conductors, said conducting member comprising first and second spaced, generally circular end members removably secured to the ends of the respective first and second conductors and a plurality of flexible conductors each having the opposite ends secured to said first and second end members, respectively, one end of each flexible conductor being secured to the associated end member at a point which is farther from the outer periphery of the associated end member than the point at which the other end of the flexible conductor is secured to the associated end member is from the outer periphery thereof.

4. An electrically conducting link adapted to electrically interconnect spaced adjacent ends of first and second conductors comprising first and second spaced substantially parallel, generally circular conducting end plates adapted to be removably secured to the ends of the respective first and second conductors, each of said end plates having mounted thereon adjacent to the outer periphery of the end plate a plurality of conducting terminal wall portions projecting away from the surface of the end plate toward the associated end plate in a direction generally parallel to a line extending between the end plates and connected together to form a closed loop terminal structure, and a plurality of flexible conductors each having the opposite ends secured to the terminal wall portions on the respective end plates and spaced around each of said end plates adjacent to the outer periphery thereof.

5. An electrically conducting link adapted to electrically interconnect spaced adjacent ends of first and second, substantially aligned conductors comprising first and second spaced, substantially parallel, generally circular, conducting end plates each having a plurality of openings spaced around the outer periphery to receive fastening means for securing said end plates to the ends of the respective conductors, a terminal structure mounted on each end plate comprising a plurality of substantially flat, conducting wall portions disposed adjacent to the outer periphery of the end plate and interconnected to form a closed loop, each of said wall portions projecting away from the surface of the associated end plate toward the other end plate in a direction generally parallel to a line extending between the end plates and including a plurality of spaced, internally threaded openings therethrough, a plurality of flexible conductors extending between said end plates and spaced around the wall portions on said end plates and fastening means passing through the ends of said flexible conductors and the openings in said wall portions to secure the ends of said flexible conductors to the associated wall portions.

6. An electrically conducting link adapted to electrically interconnect spaced adjacent ends of first and second, substantially aligned, elongated conductors, comprising first and second spaced, substantially parallel, conducting end plates adapted to be removably secured to the respective ends of the first and second conductors, first and second pairs of sheet conductors extending between and with the ends secured to said end plates, each of said sheet conductors including at least one generally arcuate portion projecting inwardly away from the outer periphery of the associated end plates and adapted to flex and permit limited relative movement of said first and second elongated conductors, said first and second pairs of sheet conductors being disposed at generally right angles with respect to one another, the arcuate portions of said first pair of sheet conductors being displaced from those of said second pair along a line extending between the ends of the elongated conductors and disposed in at least partly nested relation inside the arcuate portions of the second pair of sheet conductors.

7. An electrically conducting link adapted to electrically interconnect spaced adjacent ends of first and second substantially aligned, elongated conductors, comprising first and second spaced, substantially parallel, conducting end plates adapted to be removably secured to the respective ends of the first and second conductors, at least first and second pairs of spaced laminated sheet conductors extending between the end plates and disposed at substantially a right angle with respect to each other, the opposite ends of each sheet conductor being secured to the respective end plates, the conductors of the first pair including generally arcuate portions which project inwardly from the outer periphery of the associated end plates toward one another, the conductors of the second pair each including first and second longitudinally spaced, generally U-shaped portions which project inwardly away from the outer periphery of the associated end plates toward one other, the arcuate portions of the first pair of sheet conductors being disposed in at least partly nested relation between the U-shaped portions of the second pair of sheet conductors, the arcuate and U-shaped portions of said sheet conductors being adapted to flex and to permit predetermined relative movements of the first and second elongated conductors.

References Cited

UNITED STATES PATENTS

| | | | |
|---|---|---|---|
| 409,181 | 8/1889 | Ferranti. | |
| 1,379,962 | 5/1921 | Chilton | 64—15 |
| 1,759,567 | 5/1930 | Dibner | 339—9 |
| 1,779,297 | 10/1930 | Spurck | 174—33 X |
| 2,997,525 | 8/1961 | Powell | 174—88 X |

LEWIS H. MYERS, *Primary Examiner.*

D. L. CLAY, *Assistant Examiner.*